United States Patent
Chou et al.

(10) Patent No.: US 8,193,985 B2
(45) Date of Patent: *Jun. 5, 2012

(54) RADIO FREQUENCY POSITIONING SYSTEM AND METHOD

(75) Inventors: Feng-Jian Chou, Hsinchu Hsien (TW); Chih-Yuan Hsieh, Hsinchu Hsien (TW)

(73) Assignee: MStar Semiconductor, Inc., Hsinchu Hsien (TW)

( * ) Notice: Subject to any disclaimer, the term of this patent is extended or adjusted under 35 U.S.C. 154(b) by 361 days.

This patent is subject to a terminal disclaimer.

(21) Appl. No.: 12/546,125

(22) Filed: Aug. 24, 2009

(65) Prior Publication Data

US 2010/0052988 A1 Mar. 4, 2010

(30) Foreign Application Priority Data

Aug. 27, 2008 (TW) .............................. 97132619 A

(51) Int. Cl.
*G01S 3/02* (2006.01)
(52) U.S. Cl. ....................................................... 342/458
(58) Field of Classification Search .................... 342/458
See application file for complete search history.

(56) References Cited

U.S. PATENT DOCUMENTS

| | | | | |
|---|---|---|---|---|
| 6,738,628 | B1 * | 5/2004 | McCall et al. | 455/456.1 |
| 6,920,330 | B2 * | 7/2005 | Caronni et al. | 455/456.1 |
| 7,498,947 | B2 * | 3/2009 | Matsuura et al. | 340/572.7 |
| 2009/0058744 | A1 * | 3/2009 | Marino | 343/742 |

FOREIGN PATENT DOCUMENTS

| | | |
|---|---|---|
| CN | 1560788 A | 1/2005 |
| CN | 2911796 Y | 6/2007 |

OTHER PUBLICATIONS

Machine Translation of Chinese Office Action in Case 0810281CN, Nov. 1, 2011.*
Chinese Patent Office, Office Action 0810281CN, Nov. 1, 2011, 6 pages.

* cited by examiner

*Primary Examiner* — Thomas Tarcza
*Assistant Examiner* — Frank J McGue
(74) *Attorney, Agent, or Firm* — Edall, Shapiro & Finnan, LLC

(57) ABSTRACT

A radio frequency (RF) positioning system for positioning an RF device on a surface is provided. The RF positioning system utilizes the property of the RF device generating a response signal upon receiving an RF signal to perform positioning. The RF positioning system includes an antenna set, a switch unit, an RF module and micro-controller unit (MCU). The antenna set has a plurality of antennas in different sizes. The RF module is coupled to the switch unit. The MCU, coupled to the switch unit and the RF module, controls the switch unit to select one antenna from the antenna set and controls the RF module to generate the RF signal. The MCU further estimates a distance between the RF device and the RF positioning system according to whether the RF positioning system receives the response signal through the selected antenna.

19 Claims, 4 Drawing Sheets

RADIO FREQUENCY POSITIONING SYSTEM AND METHOD

CROSS REFERENCE TO RELATED PATENT APPLICATION

This patent application is based on Taiwan, R.O.C. patent application No. 097132619 filed on Aug. 27, 2008.

FIELD OF THE INVENTION

The present invention relates to a radio frequency (RF) positioning system, and more particularly to an RF positioning system and method for positioning an RF device on a surface.

BACKGROUND OF THE INVENTION

Radio frequency (RF) is used extensively in various short-distance wireless communications. Referring to FIG. 1, in a computer 10 with surface interface, an RF device 11, e.g., a cell phone or a radio frequency identification (RFID) tag, placed on a display panel 12, communicates with a computer host 14 through an RF module 13. The RF module 13, comprising an antenna and an associated RF circuit, is located at the back side of the display panel 12. It is to be noted that, in this application, the computer host 14 may become more versatile given that the position of the RF device 11 on the display panel 12 is identified. For example, via processing and transmission using the computer host 14, pictures saved in the RF device 11 may be displayed around the location of the RF device 11 on the display panel 12 for the user to view. For another example, when there are two or more RF devices on the display panel 12, the computer host 14 needs to locate the RF devices in order to identify the position of each RF device to proceed with subsequent communications.

SUMMARY OF THE INVENTION

Therefore, it is an object of the present invention to provide a radio frequency (RF) positioning system and method capable of positioning an RF device on a surface.

The present invention provides an RF positioning system for positioning an RF device on a surface, wherein the RF device generates a response signal upon receiving an RF signal. The RF positioning system comprises an antenna set, a switch unit, an RF module, and a micro-controller unit (MCU). The antenna set includes a plurality of antennas in different sizes. The switch unit is coupled to the antenna set. The RF module, coupled to the switch unit, generates the RF signal. The MCU, coupled to the switch unit and the RF module, controls the switch unit to select one of the antennas from the antenna set, controls the RF module to generate the RF signal, and estimates a distance between the RF device and the RF positioning system according to whether the selected antenna receives the response signal.

The present invention further provides an RF positioning method for positioning an RF device on a surface, wherein the RF device generates a response signal upon receiving an RF signal. The RF positioning method comprises steps of providing an antenna set including a plurality of antennas in different sizes, selecting one antenna from the antennas of the antenna set, radiating the RF signal via the selected antenna, and estimating a distance between the RF device and the antenna set by detecting the response signal.

BRIEF DESCRIPTION OF THE DRAWINGS

The present invention will become more readily apparent to those ordinarily skilled in the art after reviewing the following detailed description and accompanying drawings, in which.

DETAILED DESCRIPTION OF THE PREFERRED EMBODIMENT

Figure 1:
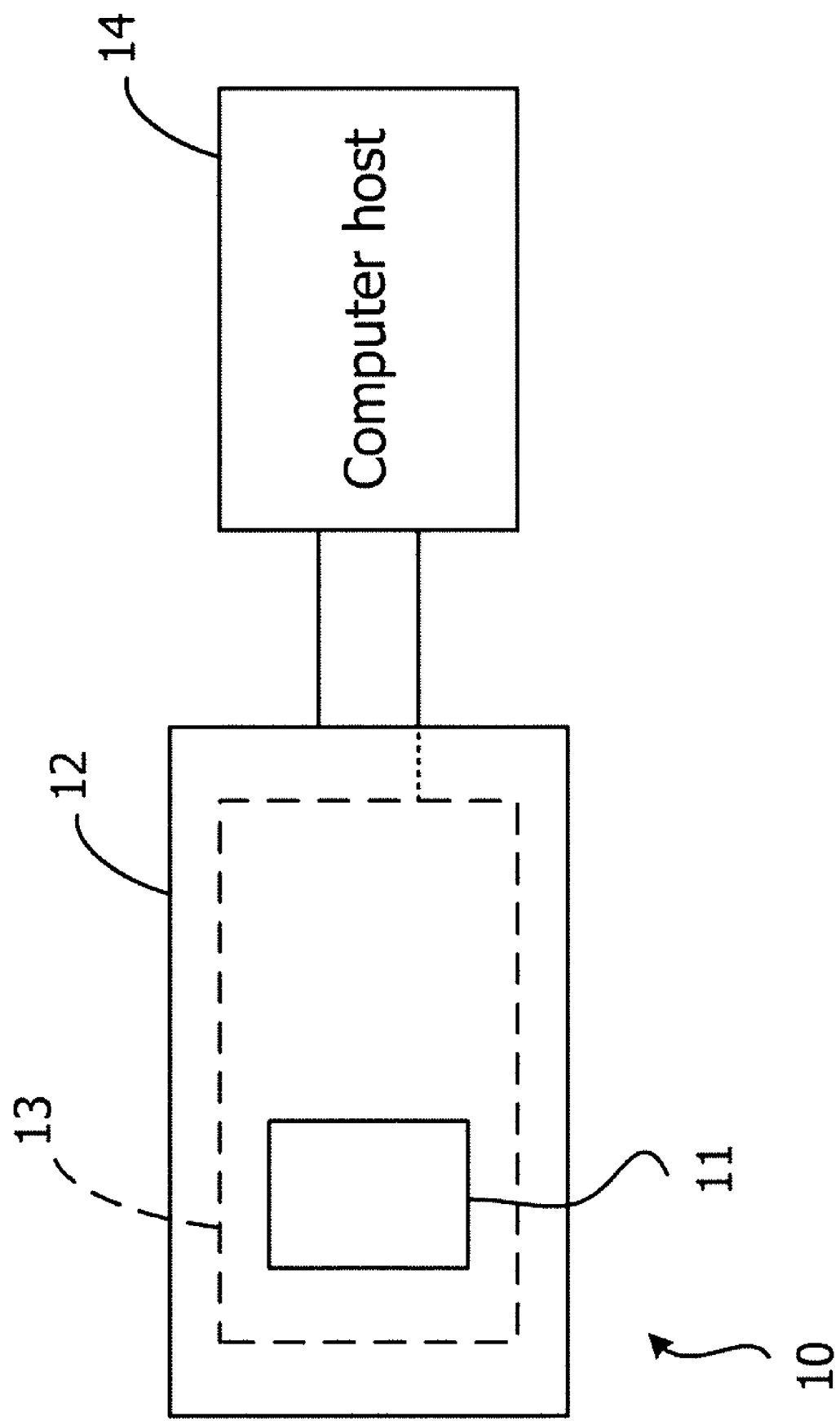
FIG. 1 is a schematic diagram of a surface computer.
Figure 2:
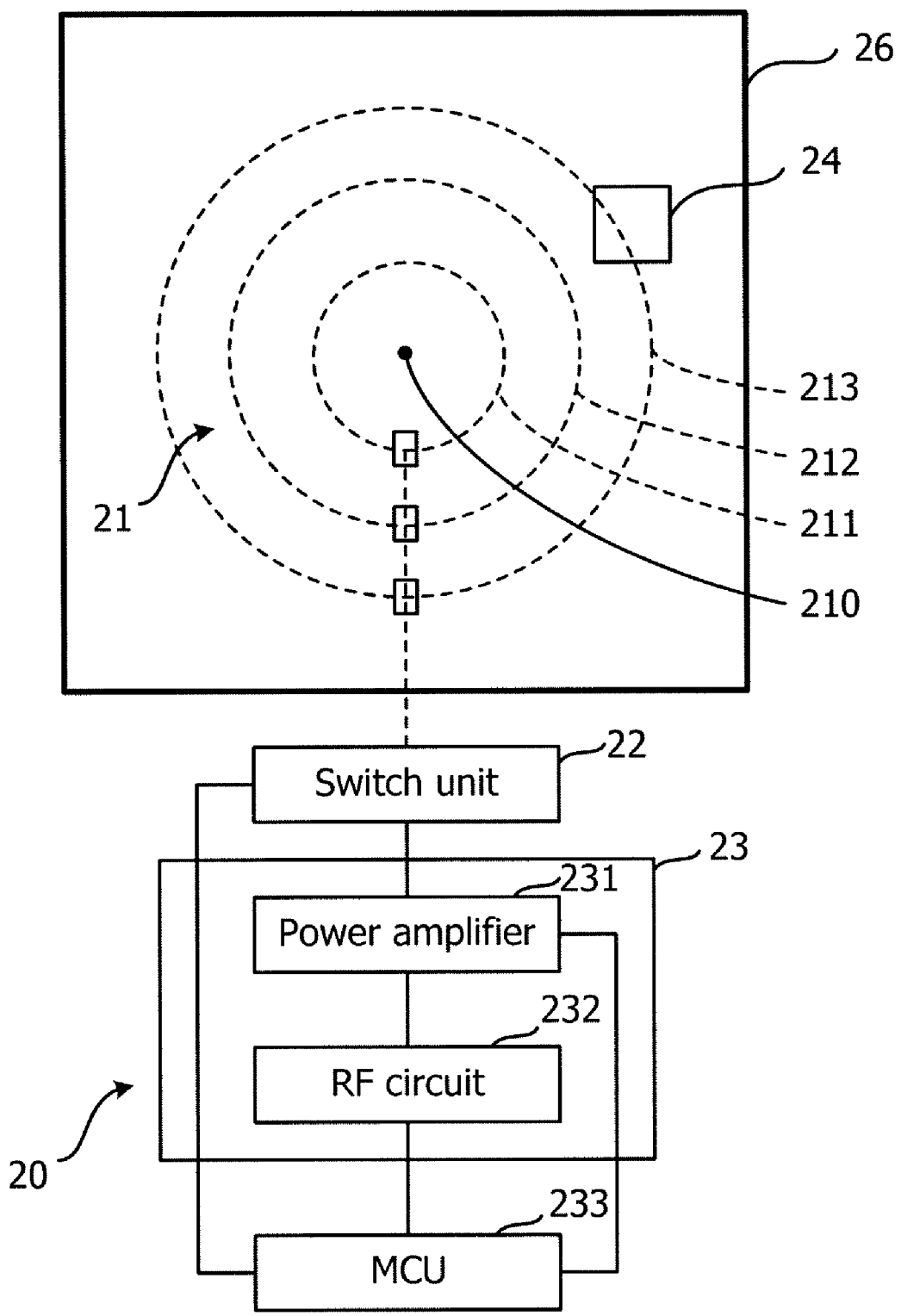
FIG. 2 is a schematic diagram of an RF positioning system according to one embodiment of the present invention.

FIG. 2 shows a schematic diagram of an RF positioning system 20 according to one embodiment of the invention. The RF positioning system 20 comprises an antenna set 21, a switch unit 22, an RF module 23 and a micro-controller unit (MCU) 233. The RF positioning system 20 is capable of positioning an RF device placed on a surface 26. The RF device may be, e.g., a radio frequency identification (RFID) tag, a mobile phone, or a portable electronic device with RFID capabilities, such as a digital camera, a personal digital assistant (PDA) and an MP3 player. The antenna set 21, including a plurality of concentric and coplanar ring antennas in different sizes, is provided below the surface 26. In the embodiment shown in FIG. 2, three concentric and coplanar ring antennas 211, 212 and 213 are taken as an example; however, the number and shape of the antennas are not limited thereto. Further, being concentric, the ring antennas have a same center 210. The RF module 23 comprises an RF circuit 232 and a power amplifier 231. The RF circuit 232 is coupled to the MCU 233; the power amplifier 231 is coupled to the MCU 233, the RF circuit 232 and the switch unit 22. The MCU 233, coupled to the switch unit 23, controls the switch unit 22 to select one of the ring antennas from the antenna set 21.

The MCU 233 controls the RF circuit 232 to generate an RF signal, which is then amplified and provided to the switch unit 22 by the power amplifier 231. The switch unit 22 then forwards the amplified RF signal to one of the ring antennas, as selected by the MCU 233 from the antenna set 21. The selected ring antenna transmits the amplified RF signal, and detects whether an RF device is present on the surface 26 by means of inductive coupling. More specifically, the RF device generates a response signal upon receiving the amplified RF signal. The response signal is received by the antenna set 21, and the presence of the RF device is thus determined and confirmed by the RF circuit 232. When the RF device is detected, it means that the RF device is located within a detecting range of the currently selected ring antenna, and a distance between the RF device and the center 210 is estimated accordingly. For example, the distance may be determined as 15 to 25 centimeters from the center 210. The size of the detecting range is dependent on the size of the ring antenna—the detecting range extends farther from the center 210 as the ring antenna gets larger, and approaches nearer to the center 210 as the ring antenna gets smaller. Therefore, a distance between an RF device and a center 210 may be estimated by determining which of the ring antennas detects the presence of the RF device. However, since the detecting ranges of the ring antennas in different sizes may overlap with one another, a same RF device on the surface 26 may be detected by two or more ring antennas at the same time. For example, suppose the ring antenna 211 has a detecting range of 0 to 15 centimeters from the center 210 while the ring antenna 212 has a detecting range of 10 to 25 centimeters from the center 210. Under such circumstances, the distance between the RF device and the center 210 is estimated according to a detecting range of a smallest ring antenna having detected the RF device. For example, when an RF device 24 is concurrently detected by the ring antennas 212 and 213, the distance between the RF device and the center 210 is determined by the detecting range of the smaller ring antenna 212; when the RF device 24 is concurrently detected by the ring antennas 211 and 212, the distance between the RF device and the center 210 is determined by the detecting range of the smaller ring antenna 211.

In one preferred embodiment, the switch unit 22 switches between the ring antennas in sequence, from the smallest ring antenna 211 to the largest ring antenna 213. An advantage of this preferred embodiment is that, the ring antenna that first detects the RF device is the smallest ring antenna according to such detection sequence, so that positioning time and power consumption of the RF positioning system 20 can be reduced.

In another preferred embodiment, the MCU 233 controls the power intensity that the power amplifier 231 uses for amplifying the RF signal. Apart from detecting range based on the smallest ring antenna of the antenna set that detects the presence of the RF device, the distance between the RF device on the surface 26 and the center 210 is more accurately estimated further according to the smallest power intensity used by the smallest ring antenna when detecting the RF device. For any ring antenna, as power of the RF signal transmitted therefrom gets larger, the detecting range of the ring antenna extends both outwardly and inwardly from the ring antenna; that is, the detecting range extends both farther from and nearer to the center 210. Such property is utilized in this preferred embodiment to more accurately estimate the distance between an RF device and the center 210. In this preferred embodiment, when a smallest ring antenna having detected the RF device is the smallest ring antenna (i.e., the antenna 211) of the antenna set 21, the RF positioning system 20 determines that the RF device is located either inside or outside of the ring antenna having detected the RF device; when a smallest ring antenna having detected the RF device is other ring antennas (i.e., the ring antennas 212 and 213) of the antenna set 21, the RF positioning system 20 determines that the RF device is located outside the antenna having detected the RF device. Further, as a result of the smallest ring antenna 211 of the antenna set 21 being small enough, an RF device located inside the smallest antenna 211 may be detected using the smallest power intensity of the power amplifier 231. In practice, taking the antenna set in FIG. 2 for example, the foregoing configuration may be achieved provided that the smallest ring antenna 211 is small enough, and size differences between the ring antennas 211, 212 and 213 are not too large (i.e., the ring antennas are located rather closely to one another). Therefore, under such antenna configuration, among the antenna set 21, for the smallest ring antenna having detected the RF device, the smaller the power intensity of the RF device detected means the nearer the RF device is located to the center 210, and vice versa.

Figure 3:
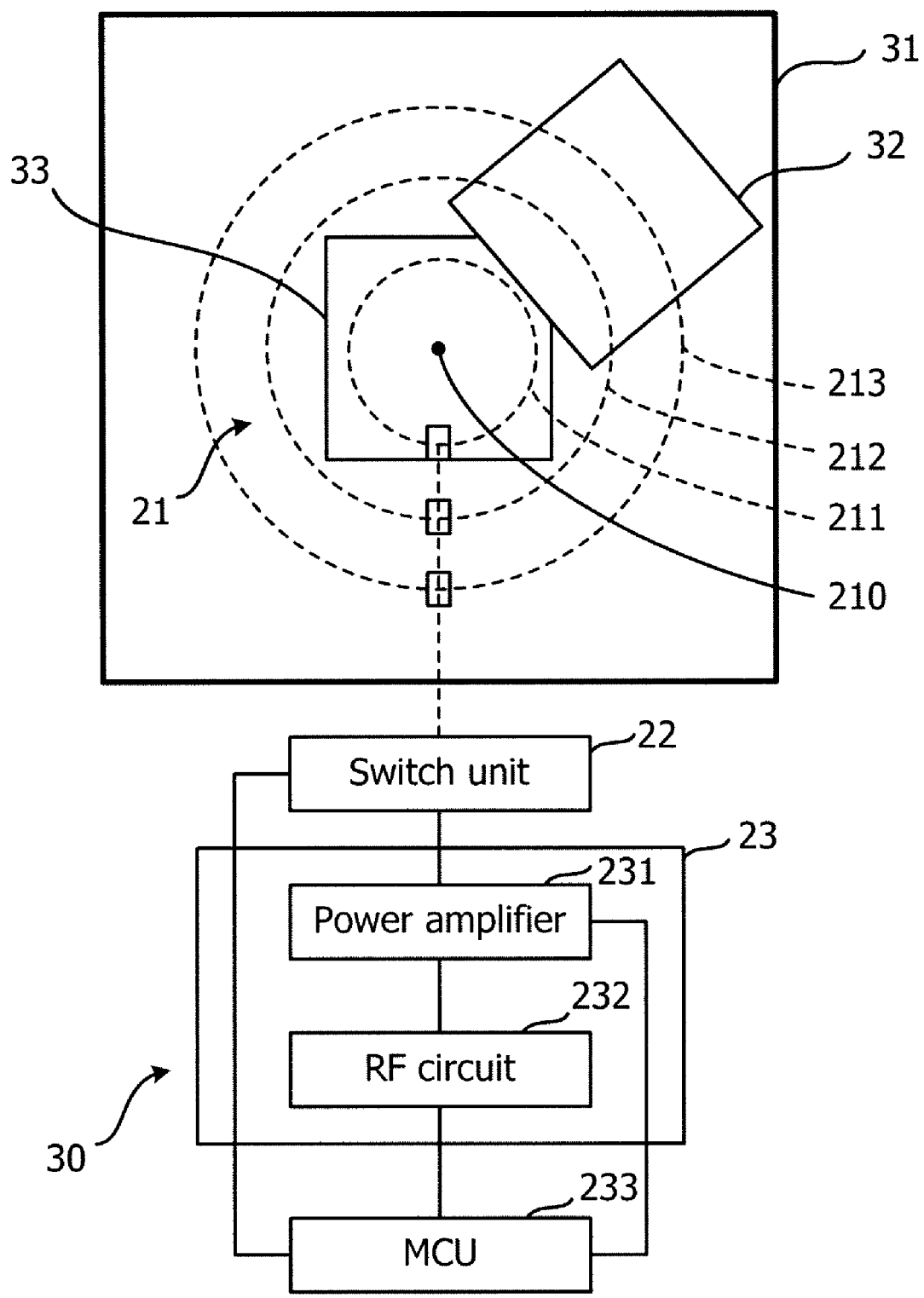
FIG. 3 is a schematic diagram of an RF positioning system according to another embodiment of the present invention.

FIG. 3 shows a schematic diagram of an RF positioning system 30 according to another preferred embodiment of the invention. A display panel 31, regarded as the foregoing surface, is coupled to the MCU 233. When the RF positioning system 30 communicates via the antenna set 21 with an RF device 32 located on the display panel 31, e.g., when the RF positioning system 30 transmits data to and from the RF device 32 or charges the RF device 32, the RF positioning system 30 detects a position of the RF device 32. When it is detected that the RF device 32 is not located within a predetermined region 33 of the display panel 31, the MCU controls the display panel 31 to display the predetermined region 33 to instruct the user to relocate the RF device 33 to the predetermined region 33. On the display panel 31, the predetermined region 33 is set at a central area of the antenna set 21 since the central area is a region having the highest transmitting/receiving efficiency. Therefore, by implementing the aforesaid positioning function, when the RF positioning system 30 determines that the distance between the RF device 32 and the center 210 is larger than a threshold (which may be determined according to a size of the smallest ring antenna 211 in the antenna set 21, for example), it means that the RF device 32 is located too far from the center 210; that is, the RF device 32 is located too far from the central area of the antenna set 21. Thus, the MCU 233 controls the display panel 31 to display the predetermined region 32, i.e., the central area of the antenna set 21, to instruct the user to relocate the RF device 31 to the predetermined region 32 to increase antenna receiving/transmitting efficiency.

Figure 4:
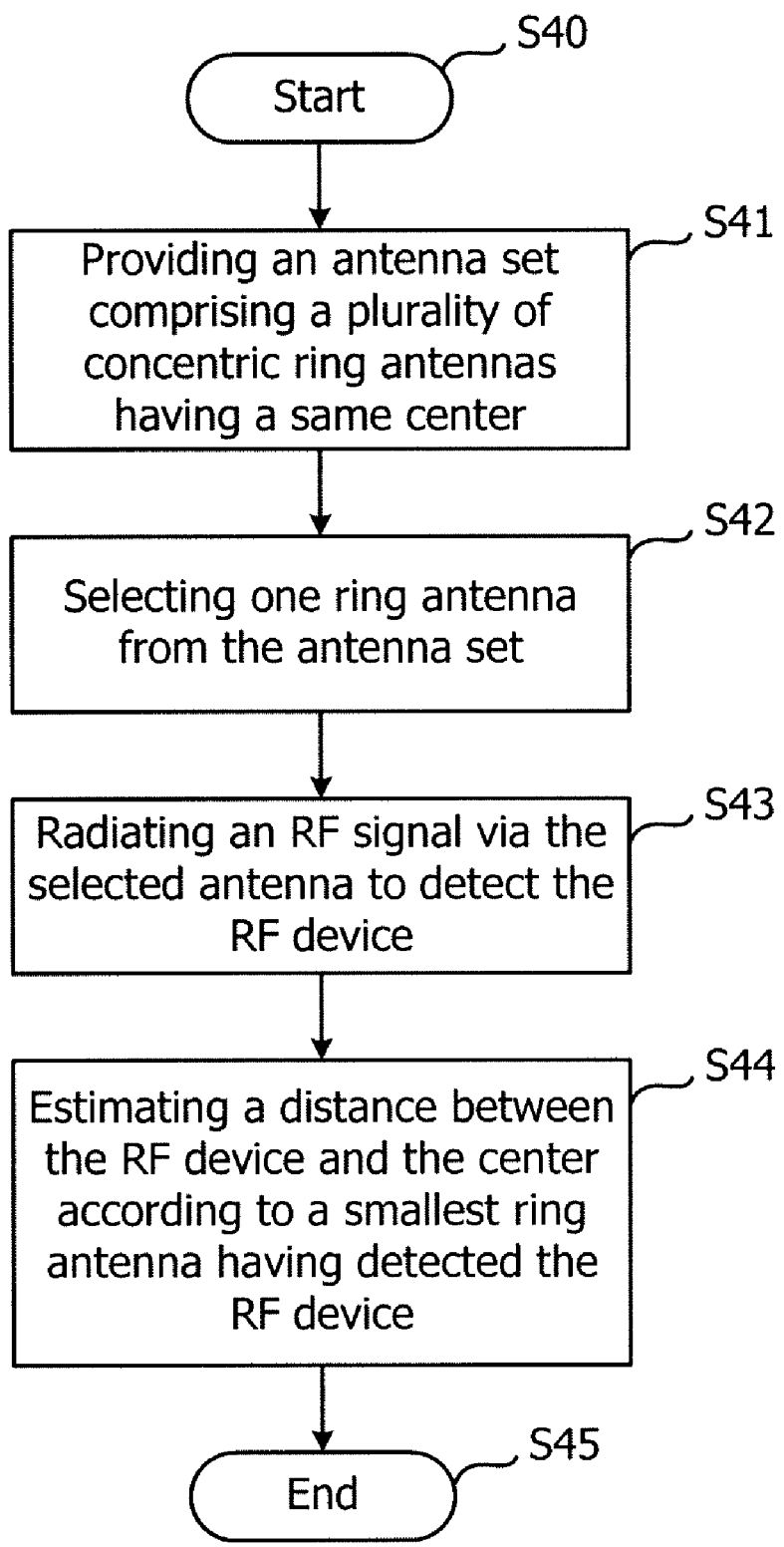
FIG. 4 is a flowchart of an RF positioning method according to yet another embodiment of the present invention.

FIG. 4 shows a flowchart of an RF positioning method according to one embodiment of the invention. The RF positioning method, for positioning an RF device located on a surface, starts with Step S40. In Step S41, an antenna set including a plurality of concentric and coplanar ring antennas in different sizes is provided. In Step S42, one of the ring antennas from the antenna set is selected according to a predetermined selection sequence. In Step S43, an RF signal is radiated via the selected ring antenna to detect the RF device. In Step S44, a distance between the RF device and the center is estimated according to a smallest ring antenna having detected the RF device. The method ends at Step S45.

In one preferred embodiment, in Step S42, the predetermined selection sequence for the antenna set starts from the smallest ring antenna to the largest ring antenna.

In another preferred embodiment, in Step S44, apart from determining distance based on the smallest ring antenna having detected the RF device, the distance between the RF device and the center may be more accurately estimated further according to the smallest power intensity of the RF signal used by the smallest ring antenna when detecting the RF device.

In another preferred embodiment, the antenna set is provided below the display panel, and the RF positioning method in FIG. 4 further comprises the following step (not shown). When the distance between the RF device and the center is larger than a threshold, a predetermined region, i.e., a central area of the antenna set, is displayed on the display panel to instruct the user to relocate the RF device to the predetermined region.

While the invention has been described in terms of what is presently considered to be the most practical and preferred embodiments, it is to be understood that the invention needs not to be limited to the above embodiments. On the contrary, it is intended to cover various modifications and similar arrangements included within the spirit and scope of the appended claims which are to be accorded with the broadest interpretation so as to encompass all such modifications and similar structures.

What is claimed is:

1. A radio frequency (RF) positioning system, for positioning an RF device on a surface, the RF device generating a response signal upon receiving an RF signal, the RF positioning system comprising:

an antenna set, having a plurality of concentrically arranged antennas;

a switch unit, coupled to the antenna set;

an RF module, coupled to the switch unit, for generating the RF signal; and a micro-controller unit (MCU), coupled to the switch unit and the RF module, for controlling the switch unit to select an antenna from the antennas of the antenna set, controlling the RF module to generate the RF signal, and estimating a distance between the RF device and the RF positioning system according to whether the response signal is received through the selected antenna.

2. The RF positioning system as claimed in claim 1, wherein the RF device is a portable electronic device having radio frequency identification (RFID) capabilities.

3. The RF positioning system as claimed in claim 1, wherein the RF module comprises:

an RF circuit, coupled to the MCU, controlled by the MCU to generate the RF signal; and a power amplifier, coupled to the RF circuit and the switch unit, for amplifying the RF signal and providing the amplified RF signal to the selected antenna.

4. The RF positioning system as claimed in claim 3, wherein the MCU is coupled to the power amplifier to control power intensity utilized by the power amplifier for amplifying the RF signal.

5. The RF positioning system as claimed in claim 1, wherein the switch unit switches between the antennas according to sizes of the antennas.

6. The RF positioning system as claimed in claim 5, wherein the switch unit switches between the antennas from a smallest antenna to a largest antenna.

7. The RF positioning system as claimed in claim 1, wherein the antennas are ring antennas having a same center, and a distance between the RF device and the center is estimated according to smallest power intensity of the RF signal used by, in the antenna set, a smallest antenna having received the response signal.

8. The RF positioning system as claimed in claim 1, wherein the surface is associated with a panel display coupled to the MCU, and the MCU controls the display panel to display a predetermined region when the distance between the RF device and the center is larger than a threshold, to instruct a user to relocate the RF device to the predetermined region.

9. The RF positioning system as claimed in claim 8, wherein the predetermined region is a central area of the antenna set.

10. The RF positioning system as claimed in claim 1, wherein the antennas are coplanar.

11. An RF positioning method, for positioning an RF device on a surface, the RF device generating a response signal upon receiving an RF signal, the RF positioning method comprising:

selecting a selected antenna from a set of concentrically arranged antennas according to a predetermined selection sequence;

radiating the RF signal via the selected antenna; and estimating a distance between the RF device and the selected antenna by detecting the response signal.

12. The RF positioning method as claimed in claim 11, wherein the RF device is a portable electronic device having RFID capabilities.

13. The RF positioning method as claimed in claim 11, wherein the predetermined selection sequence for the antennas is associated with sizes of the antennas.

14. The RF positioning method as claimed in claim 13, wherein the predetermined selection sequence for the antennas proceeds from a smallest antenna to a largest antenna.

15. The RF positioning method as claimed in claim 11, further comprising a step of:

amplifying the RF signal to provide the RF signal having predetermined power intensity.

16. The RF positioning method as claimed in claim 11, wherein the set of concentrically arranged antennas comprises ring antennas having a same center, and a distance between the RF device and the center is estimated according to smallest power intensity of the RF signal used by, in the set of concentrically arranged antennas, a smallest antenna having received the response signal.

17. The RF positioning method as claimed in claim 11, the surface being a display panel, the RF positioning method further comprising a step of:

displaying a predetermined region when the distance between the RF device and the center is larger than a threshold to instruct a user to relocate the RF device to the predetermined region.

18. The RF positioning method as claimed in claim 17, wherein the predetermined region is a central area of the set of concentrically arranged antennas.

19. The RF positioning method as claimed in claim 11, wherein antennas in the set of concentrically arranged antennas are coplanar.

* * * * *